United States Patent
Mirfakhraei et al.

(10) Patent No.: US 11,057,831 B2
(45) Date of Patent: Jul. 6, 2021

(54) COMPRESSIVE SENSING USING TARGET WAKE TIMES

(71) Applicant: Cisco Technology, inc., San Jose, CA (US)

(72) Inventors: Khashayar Mirfakhraei, Los Altos, CA (US); Amir Hosein Kamalizad, San Mateo, CA (US); Xu Zhang, Fremont, CA (US); Ardalan Alizadeh, San Jose, CA (US); Vishal Satyendra Desai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 98 days.

(21) Appl. No.: 16/408,546

(22) Filed: May 10, 2019

(65) Prior Publication Data

US 2020/0359312 A1 Nov. 12, 2020

(51) Int. Cl.
  *H04W 52/02* (2009.01)
  *H04W 4/38* (2018.01)
  *H04L 29/08* (2006.01)

(52) U.S. Cl.
  CPC ......... *H04W 52/0216* (2013.01); *H04L 67/12* (2013.01); *H04W 4/38* (2018.02)

(58) Field of Classification Search
  CPC ............. H04W 84/12; H04W 52/0216; H04W 72/0453; H04W 72/0446; H04W 52/0229; H04W 72/1215; H04W 88/12; H04W 28/26; H04W 72/1247; H04W 72/1289; H04W 24/02; Y02D 30/70; Y02D 70/142; Y02D 70/144; Y02D 70/1262; Y02D 70/164; Y02D 70/1224; H04L 5/0055; H04L 69/323; H04L 49/9005; H04L 69/28; H04L 69/324
  See application file for complete search history.

(56) References Cited

U.S. PATENT DOCUMENTS

| | | | |
|---|---|---|---|
| 9,313,739 B2 | 4/2016 | Jafarian et al. | |
| 9,713,087 B2 | 7/2017 | Asterjadhi et al. | |
| 10,033,577 B2 | 7/2018 | Soriaga et al. | |
| 10,791,516 B1* | 9/2020 | Chu | H04N 1/00896 |
| 2017/0195954 A1* | 7/2017 | Ghosh | H04W 28/0221 |
| 2019/0014538 A1* | 1/2019 | Patil | H04W 74/008 |

(Continued)

FOREIGN PATENT DOCUMENTS

CN 102571573 2/2015

OTHER PUBLICATIONS

Baños-Gonzalez, et al., "IEEE 802.11ah: A Technology to Face the IoT Challenge", Sensors 2016, 16, 1960, pp. 1-21, 2016, MDPI.

(Continued)

*Primary Examiner* — Sai Aung
(74) *Attorney, Agent, or Firm* — Behmke Innovation Group; Kenneth J. Heywood; Jonathon P. Western (57) ABSTRACT

In one embodiment, a supervisory service for a wireless network computes a compressive sensing schedule for a plurality of sensors in the wireless network. The service sends target wake time (TWT) messages to a subset of the plurality of sensors according to the computed compressive sensing schedule. The service receives, in response to the TWT messages, sensor readings from the subset of the plurality of sensors. The service performs compressive sensing on the received sensor readings.

18 Claims, 8 Drawing Sheets

(56) References Cited

U.S. PATENT DOCUMENTS

2019/0251858 A1\* 8/2019 Baharav .................. G09B 19/00
2020/0229086 A1\* 7/2020 Monajemi ......... H04W 52/0216

OTHER PUBLICATIONS

Du, et al., "Energy Efficient Sensor Activation for Water Distribution Networks Based on Compressive Sensing", IEEE Journal on Selected Areas in Communications, vol. 33, No. 12, pp. 2997-3010, Dec. 2015, IEEE.

Gates, Alexandra., "How Will Target Wake Time Help Mobile Devices and IoT in 802.11ax?", https://blog.aerohive.com/how-will-target-wake-time-help-mobile-devices-and-iot-in-802-11ax/, Technology, 2 pages, Mar. 13, 2018, Aerohive Networks.

Hazmi, et al., "Feasibility Study of IEEE 802.11ah Radio Technology for IoT and M2M use Cases", GC'12 Workshop: Second International Workshop on Machine-to-Machine Communications 'Key' to the Future Internet of Things, pp. 1687-1692, 2012, IEEE.

Kulkarni, et al., "Efficient Orthogonal Frequency-Division Multiple Access Scheduling for Internet of Things Devices", IP.com Technical Disclosure, Feb. 5, 2018, 4 pages, Cisco Systems, Inc.

Huang, Dennis, "802.11ax Fundamentals: Target Wake Time (TWT)", https://theruckusroom.ruckuswireless.com/wired-wireless/author/dennis-huang/, Sep. 25, 2018, 5 pages, Ruckus Networks.

Qutab-Ud-Din, et al., "Performance analysis of IoT enabling IEEE 802.11ah technology and its RAW mechanism with non-cross slot boundary holding schemes", 2015 IEEE 16th International Symposium on a World of Wireless, Mobile and Multimedia Networks (WoWMoM), Boston, MA, pp. 1-6, 2015, IEEE.

Raeesi, et al., "Performance Enhancement and Evaluation of IEEE 802.11ah Multi-Access Point Network Using Restricted Access Window Mechanism", DCOSS '14 Proceedings of the 2014 IEEE International Conference on Distributed Computing in Sensor Systems, pp. 287-293, May 2014, IEEE.

Raeesi, et al., "Performance Evaluation of IEEE 802.11ah and its Restricted Access Window Mechanism", ICC'14—W7: Workshop on M2M Communications for Next Generation IoT, pp. 460-466, 2014, IEEE.

Shen, et al., "Nonuniform Compressive Sensing for Heterogeneous Wireless Sensor Networks", IEEE Sensors Journal, vol. 13, No. 6, pp. 2120-2128, Jun. 2013, IEEE.

Wang, et al., "Data Gathering in Wireless Sensor Networks Through Intelligent Compressive Sensing", 2012 Proceedings IEEE INFOCOM, 9 pages, 2012, IEEE.

Zheng, et al., "Capacity and Delay Analysis for Data Gathering with Compressive Sensing in Wireless Sensor Networks", IEEE Transactions on Wireless Communications ( vol. 12 , Issue: 2 , Feb. 2013 ), pp. 917-927, 2013, IEEE.

"Compressed Sensing", Wikipedia: https://en.wikipedia.org/wiki/Compressed_sensing, Apr. 24, 2019, printed May 6, 2019, 9 pages, Wikimedia Foundation, Inc.

"IEEE 802.11ax: The Sixth Generation of Wi-Fi", Technical white paper—Cisco public, https://www.cisco.com/c/dam/en/us/products/collateral/wireless/white-paper-c11-740788.pdf, 15 pages, 2018, Cisco.

\* cited by examiner

COMPRESSIVE SENSING USING TARGET WAKE TIMES

TECHNICAL FIELD

The present disclosure relates generally to computer networks, and, more particularly, to compressive sensing using target wake times.

BACKGROUND

The Internet of Things, or "IoT" for short, represents an evolution of computer networks that seeks to connect many everyday objects to the Internet. Notably, there has been a recent proliferation of "smart" devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room, when a person enters the room.

In contrast to many traditional computer networks, various challenges are presented with IoT devices, such as lossy links, low bandwidth, battery operation, low memory and/or processing capability of the device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to the IoT.

Compressive sensing, which attempts to reconstruct a signal from a sparse set of measurements, is potentially an attractive technique for use with IoT sensors. Notably, as the full set of possible sensor readings is not required under compressive sensing, not every IoT sensor in a deployment needs to be active at any given time. This means that at least some of the sensors can remain asleep during a given round of measuring, thereby conserving their battery power. However, scheduling which sensors should be awake and reporting sensor readings, as well as when, remains quite challenging. Indeed, some IoT sensors may lack the resources to even store a communication schedule.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a supervisory service for a wireless network computes a compressive sensing schedule for a plurality of sensors in the wireless network. The service sends target wake time (TWT) messages to a subset of the plurality of sensors according to the computed compressive sensing schedule. The service receives, in response to the TWT messages, sensor readings from the subset of the plurality of sensors. The service performs compressive sensing on the received sensor readings.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Figure 1:
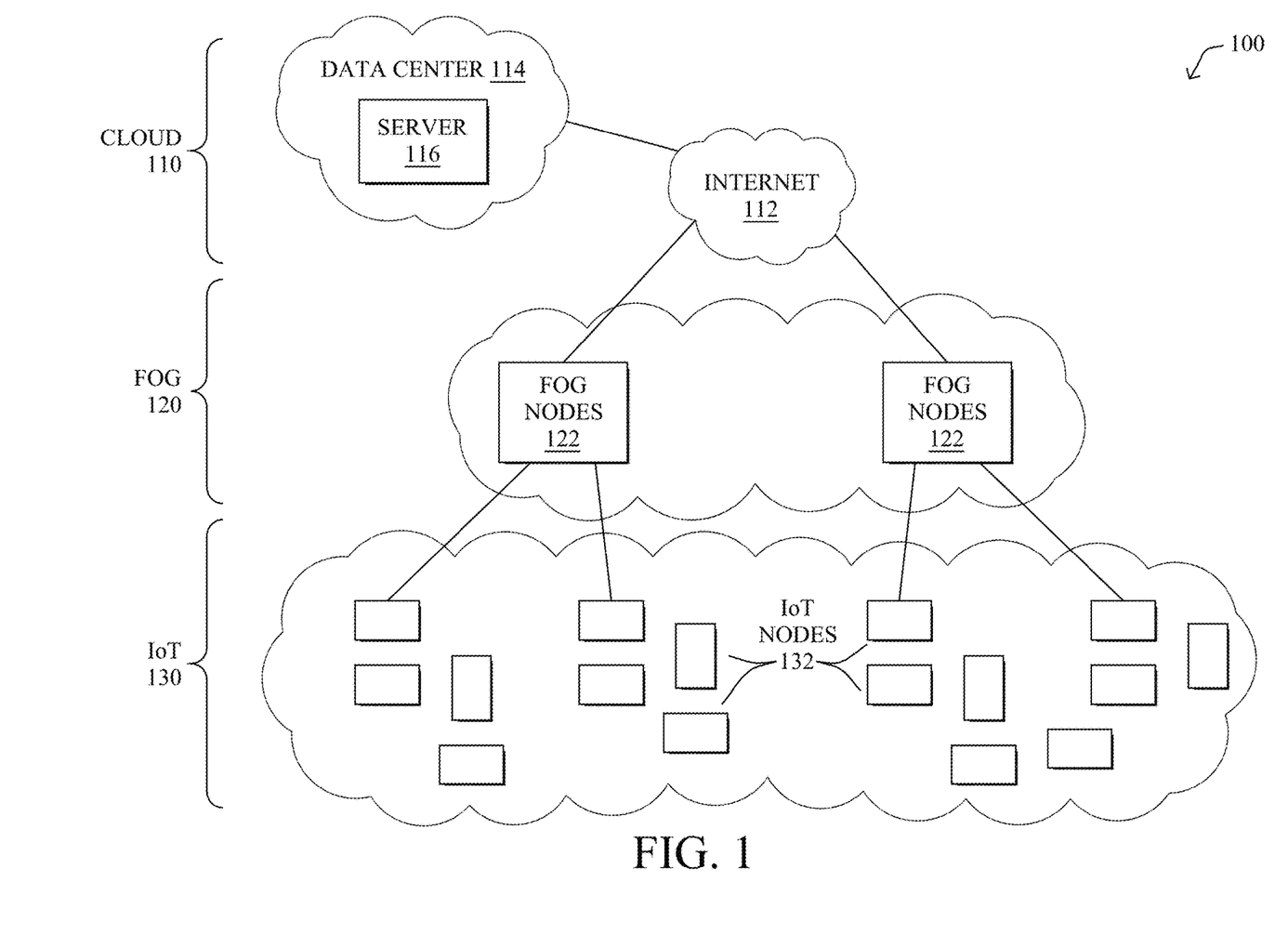
FIG. 1 illustrate an example computer network.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
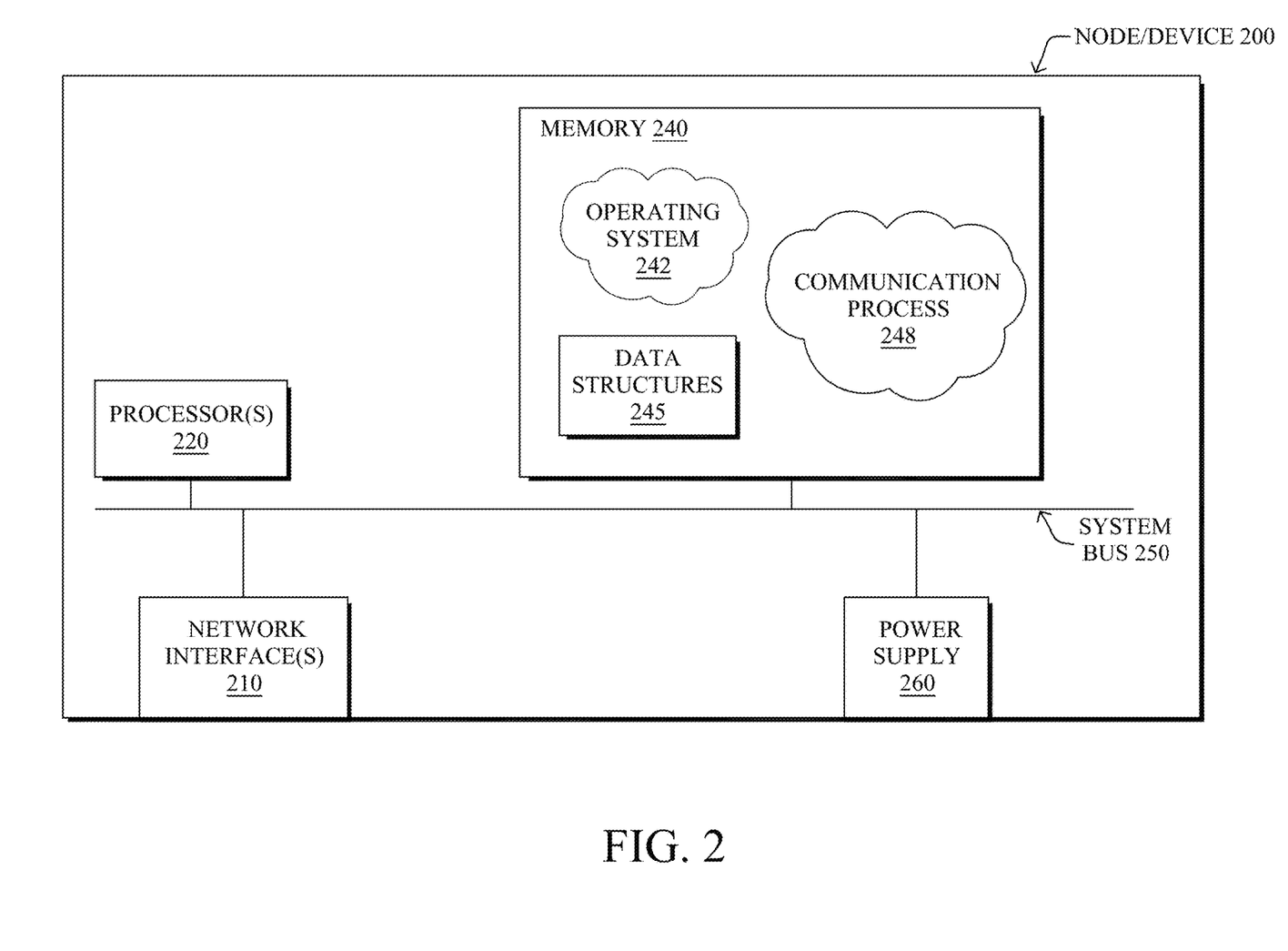
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data to and/or from a network. For example, network interface(s) 210 may include a wireless receiver, transmitter, or both (e.g., a transceiver).

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. Operating system 242, portions of which is typically resident in memory 240 and executed by the processor, functionally organizes the device by, inter alia, invoking operations in support of software processes and/or services executing on the device. These software processes and/or services may comprise a communication process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
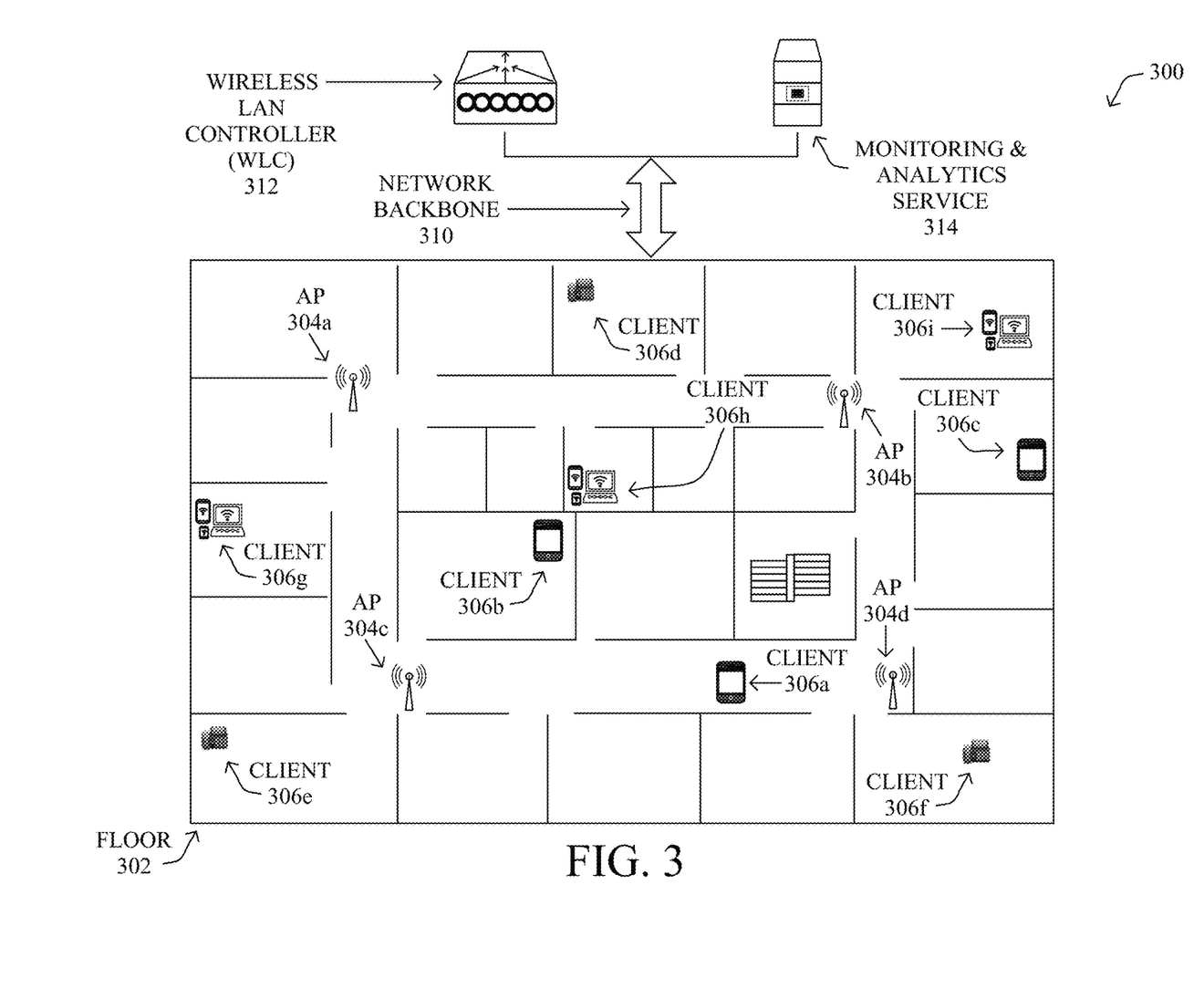
FIG. 3 illustrates an example wireless network.

FIG. 3 illustrates an example wireless network 300, according to various embodiments. Wireless network 300 may be deployed to a physical location, such as floor 302 shown, and may include various infrastructure devices. These infrastructure devices may include, for example, one or more access points (APs) 304 that provide wireless connectivity to the various wireless clients 306 distributed throughout the location. For illustrative purposes, APs 304a-304d and clients 306a-306i are depicted in FIG. 3. However, as would be appreciated, a wireless network deployment may include any number of APs and clients.

A network backbone 310 may interconnect APs 304 and provide a connection between APs 304 and any number of supervisory devices or services that provide control over APs 304. For example, as shown, a wireless LAN controller (WLC) 312 may control some or all of APs 304a-304d, by setting their control parameters (e.g., max number of attached clients, channels used, wireless modes, etc.). Another supervisory service that oversees wireless network 300 may be a monitoring and analytics service 314 that measures and monitors the performance of wireless network 300 and, if so configured, may also adjust the operation of wireless network 300 based on the monitored performance (e.g., via WLC 312, etc.). Note that service 314 may be implemented directly on WLC 312 or may operate in conjunction therewith, in various implementations.

Network backbone 310 may further provide connectivity between the infrastructure of the local network and a larger network, such as the Internet, a Multiprotocol Label Switching (MPLS) network, or the like. Accordingly, WLC 312 and/or monitoring and analytics service 314 may be located on the same local network as APs 304 or, alternatively, may be located remotely, such as in a remote datacenter, in the cloud, etc. To provide such connectivity, network backbone 310 may include any number of wired connections (e.g., Ethernet, optical, etc.) and/or wireless connections (e.g., cellular, etc.), as well as any number of networking devices (e.g., routers, switches, etc.).

The types and configurations of clients 306 in network 300 can vary greatly, ranging from powerful computing devices to any number of different types of IoT nodes/devices. For example, clients 306a-306i may include, but are not limited to, wireless sensors, actuators, thermostats, relays, mobile phones, other mobile devices, and the like.

A new feature in 802.11ax is called "Target Wake Time (TWT)" that allows clients 306 and their APs 304 to negotiate specific time windows during which the client is expected to wake, in order to communicate with the AP. Such time windows can be announced by a client 306 and accepted by the AP 304, or otherwise dictated by the AP 304. This feature allows the AP 304 to manage the contention in a single basic service set (BSS) by splitting the time resources among the clients 306 that would otherwise attempt to access the medium all at the same time, reducing the media access control (MAC) efficiency. At the same time, the TWT mechanism provides power saving opportunities for the clients 306. Because of the above advantages of the TWT mechanism, it is one that is expected to be used heavily in 802.11ax applications.

Compressive sensing, also known as compressed sensing, compressive sampling, and sparse sampling, generally refers to a signal processing technique in which a signal is reconstructed from a sparse set of signals. In the case of sensor networks, this can entail leveraging the sparsity property of sensing target (or low-dimension, which is common for natural things, such as continuity of temperature), and requires measurements from only a subset of the sensors to reconstruct the value of the sensing target. Because the sensing target has a much smaller dimension compared to the sensor grid, we the sensing results can be translated into a different vector space and the value of the sensing target reconstructed for essentially any sensor at any given time.

By way of example of compressive sensing, consider the case of a sensor network in which temperature sensors are deployed to each room of a building. While a basic implementation may require each sensor to report the temperature reading of its room, doing so is not required to obtain the temperature in any given room. Indeed, if every room surrounding a particular room is at 72° F., it is very likely that the temperature of that room is also at 72° F., meaning that the temperature in the room can be inferred from the sensors in the surrounding rooms. Thus, under compressive sensing, it is not necessary for the temperature sensor in the room to also report its measurements during every reporting period, as the temperature in the room can be inferred from the temperature readings in the other rooms. This property holds true for any underlying linear system.

As noted above, a key observation is that compressive sensing is a potentially attractive technique for use with IoT sensors. Indeed, not having to report sensor readings every reporting cycle means that a sensor can conserve power, thereby extending its battery life. However, it may not be feasible for each sensor to store the compressive sensing schedule, due to the limited resources of the sensor. In addition, the sensing schedule can change frequently, to adapt to varying environmental factors and task requirements. This means that the sensor will consume additional power to receive the updated schedule from its corresponding AP. Moreover, uncoordinated uplink of IoT devices can lead to serious contention and additional energy consumption. Accordingly, what is needed is a way to coordinate and schedule sensing in a manner that overcomes these challenges.

Compressive Sensing Using Target Wake Times

The techniques herein introduce a framework that employs 802.11 Target Wake Time (TWT) messages to enable extremely flexible compressive sensing scheduling that can change on-the-fly to adapt to varying environmental factors and task requirements. In some aspects, the sensors do not need to maintain a schedule of 'when to sense.' Instead, the wireless network employs TWT messages to trigger different sensors to awaken, take sensor readings, and send the readings back to the network for compressive sensing, according to a compressive sensing schedule.

Specifically, according to one or more embodiments of the disclosure as described in detail below, a supervisory service for a wireless network computes a compressive sensing schedule for a plurality of sensors in the wireless network. The service sends target wake time (TWT) messages to a subset of the plurality of sensors according to the computed compressive sensing schedule. The service receives, in response to the TWT messages, sensor readings from the subset of the plurality of sensors. The service performs compressive sensing on the received sensor readings.

Illustratively, the techniques described herein may be performed by hardware, software, and/or firmware, such as in accordance with the communication process 248, which may include computer executable instructions executed by the processor 220 (or independent processor of interfaces 210) to perform functions relating to the techniques described herein.

Operationally, the techniques herein propose leveraging the TWT mechanism introduced in the 802.11ax standard, to signal deployed sensors to report their sensor readings according to a compressive sensing schedule. By leveraging TWT messaging, the sensors do not need to store or update the compressive sensing schedule. Instead, the sensors only need to known when next to report a sensor reading, as indicated by a TWT message from its access point.

Implementing compressive sensing in a wireless network using the TWT mechanism may entail both intra-cell and inter-cell coordination (e.g., between sensors attached to the same AP and those attached to different APs).

Figure 4A:
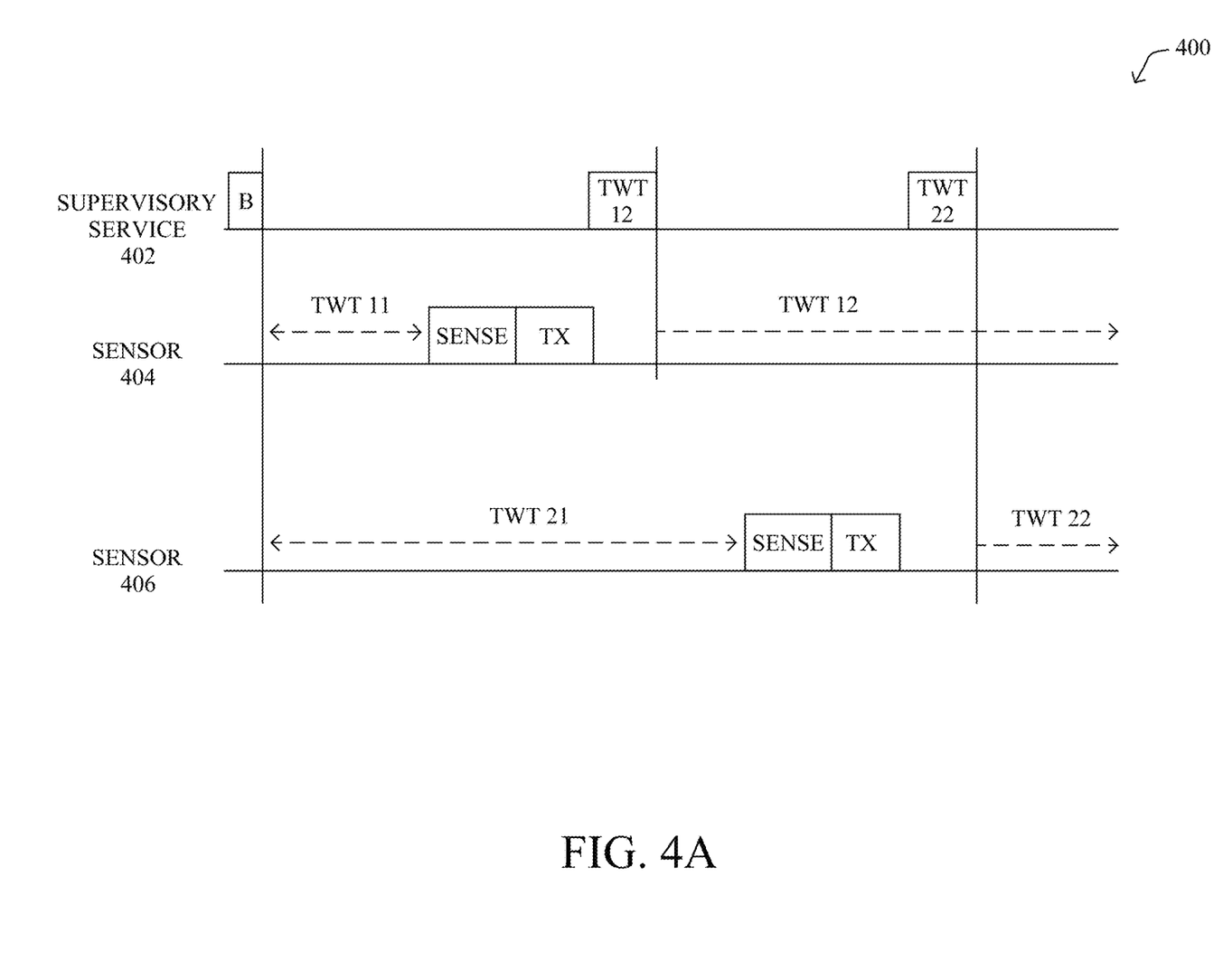
FIGS. 4A-4C illustrate examples of using target wake times (TWTs) to schedule sensor reporting.
Figure 4B:
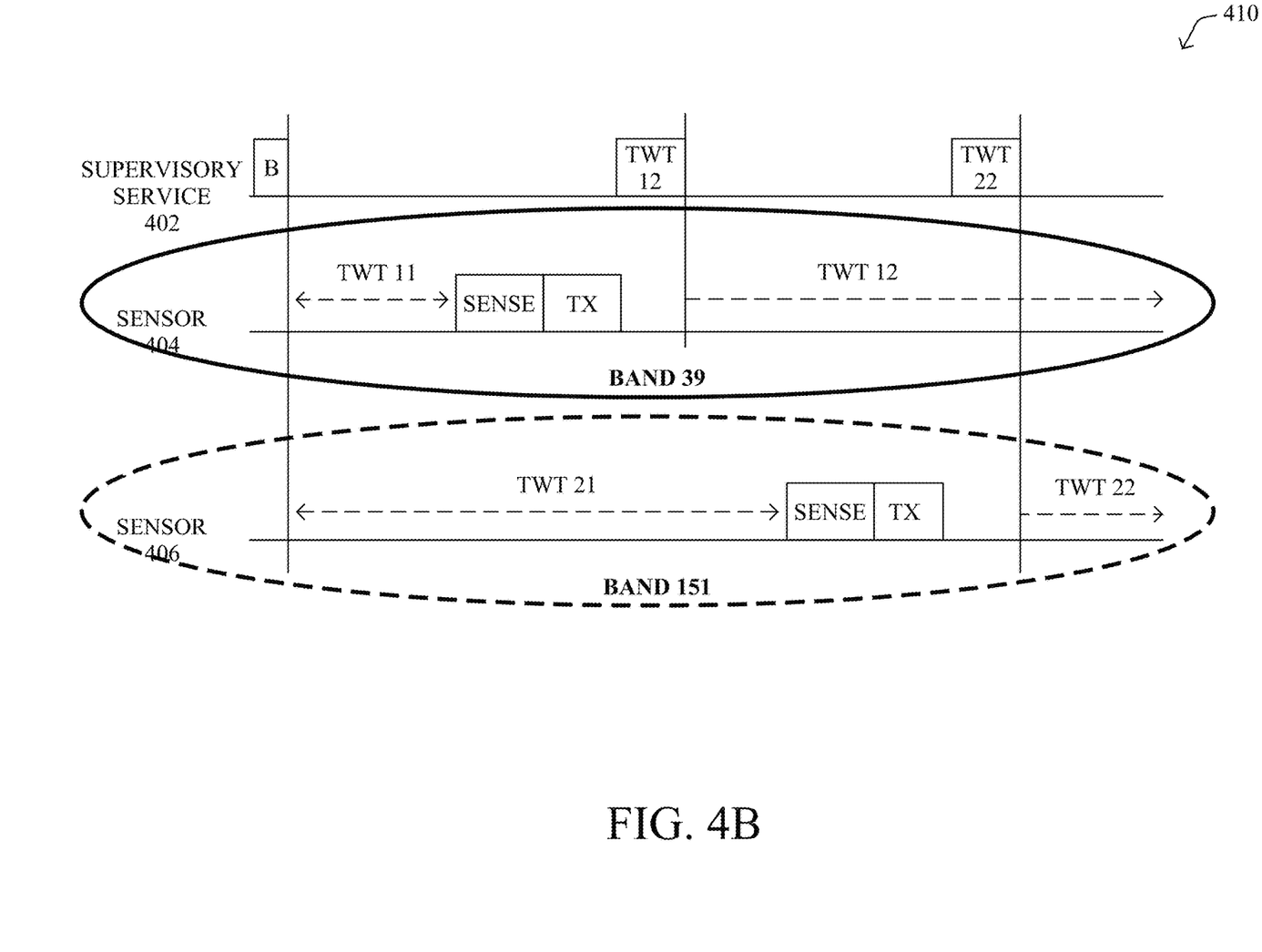
Figure 4C:
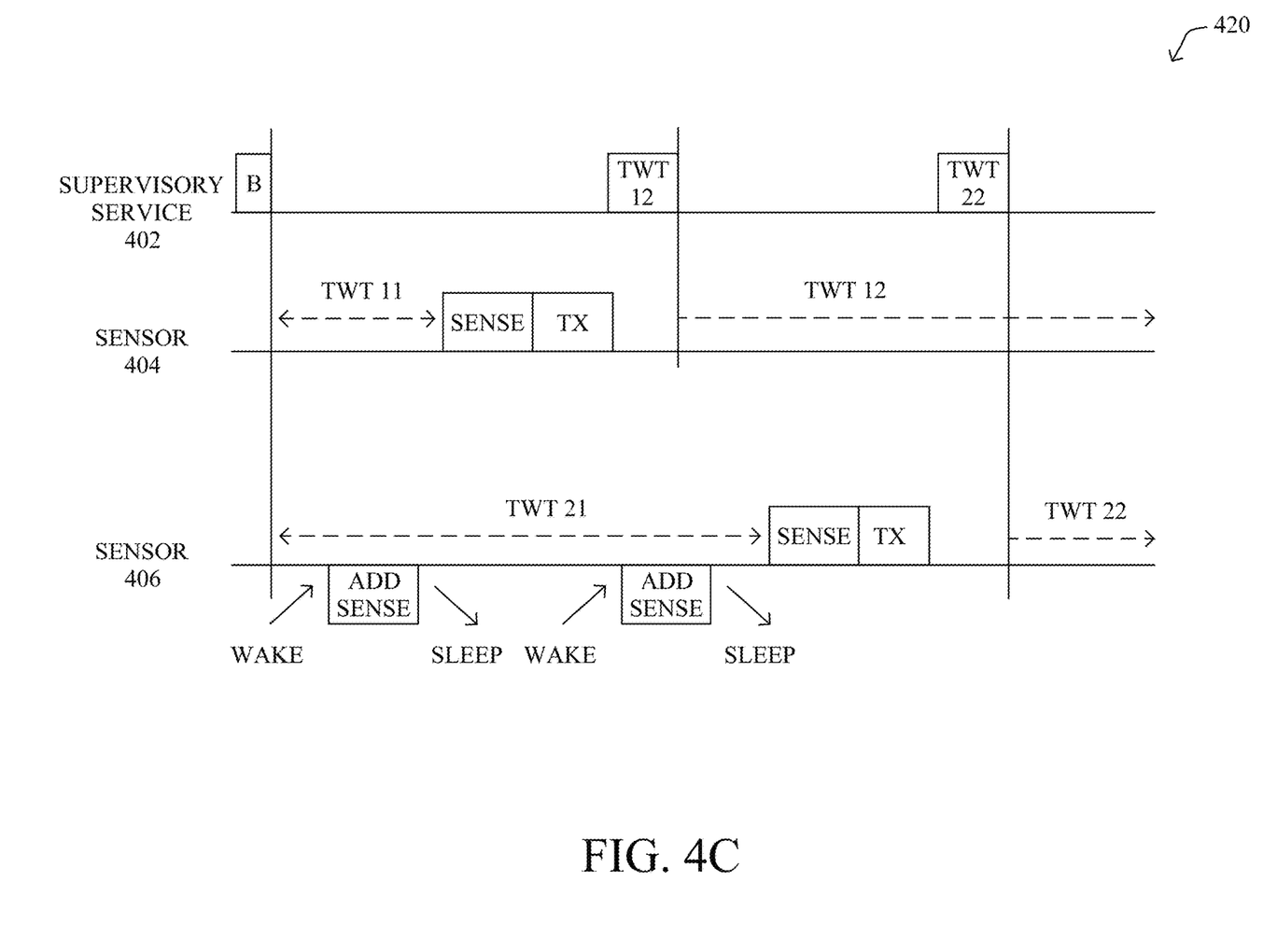

FIGS. 4A-4C illustrate examples of using TWTs to schedule sensor reporting among intra-cell sensors, according to various embodiments. As shown in example 400 in FIG. 4A, assume that there is a supervisory service 402 in the wireless network, as well as two sensors: sensor 404 and sensor 406. For example, supervisory service 402 may be WLC 312, monitoring & analytics service 314, or even a service resident to an AP 304, as described previously with respect to FIG. 3. Similarly, sensors 404-406 may be wireless clients 306 serviced by the various APs 304, described previously with respect to FIG. 3.

As a first step, supervisory service 402 may identify the various sensors in the wireless network, such as sensors 404-406, that take measurements/readings of interest. In turn, service 402 may compute a compressive sensing schedule for those sensors. In other words, given information about the deployed sensors (e.g., their locations, etc.), the service may select a subset of sensors that should report their sensor readings at any given time in the computed schedule. Based on this schedule, service 402 may send TWT messages to the corresponding sensors, with each message indicating a target wake time for the receiving sensor.

In one embodiment, as shown, reception of a TWT message sent by supervisory service 402 to sensors 404-406 may cause the receiving sensor to enter into a sleep mode until the wake time indicated by the TWT message. During this sleep mode, the sensor may either fully depower itself or, alternatively, depower its radio, to help conserve battery power. On awaking, the sensor may take a sensor reading and transmit (TX) the sensor reading to supervisory service 402. For example, on expiration of TWT period 11, sensor 404 may take a reading and communicate the reading back to supervisory service 402. In turn, service 402 may return a TWT message to sensor 404 (e.g., indicating TWT period 12), according to the compressive sensing schedule, thereby causing sensor 404 to return to its sleep state until its next sensor reading needs to be reported. Similarly, as shown, sensor 406 may be instructed to remain in its sleep state until its scheduled TWT at which point sensor 406 will wake, take a reading/measurement, and transmit the reading to supervisory service 402.

As would be appreciated, using the TWT mechanism to implement the compressive sensing schedule of supervisory service 402 has several advantages:

(1) Compressive sensing greatly reduces the number of sensing tasks of sensors 404-406 and allows them to completely shut down both their radios and sensors, in-between sensing tasks. Doing so can reduce their energy consumptions to an extremely low level.

(2) Supervisory service 402 no longer needs to pre-program or send some pre-determined sensing schedule to sensors 404-406. This allows service 402 to change the schedule on-the-fly, adapting to varying sensing requirements, change of sensing targets, environmental changes such as wireless channel variations, sensor battery levels, and etc. In other words, the framework introduced herein supports extremely flexible compressive sensing scheduling.

(3) With the TWT "triggering" design, sensors 404-406 can have extremely simple design with low cost. They do not need to have scheduling logic and also do not need to have large memory to store sensor measurements/readings or pre-computed sensing schedules (sensing matrix).

(4) The TWT mechanism of 802.11ax also provides perfect time synchronization for both sensing and uplink data transmission. The time synchronization for sensing at different sensors enable better reconstruction of compressive sensing at service 402, as it knows exactly when the sensor senses, while the time sync for uplink reduces contention and saves energy.

In further embodiments, different sensors attached to the same AP may have different tasks and, thus, need different compressive sensing schedules. For example, consider the example 410 in FIG. 4B in which sensor 404 and sensor 406 require different compressive sensing schedules. Because current APs usually have multiple radio frequency (RF) chains, supervisory service 402 can assign different sensors to different frequency bands and use TWT signaling, to implement different compressive sensing schedules, in some embodiments. For example, sensor 404 may be assigned to band 39, while sensor 406 may be assigned to band 151.

In further embodiments, the supervisory service may also decouple the sensing and data transmission tasks of the sensors. For example, as show in example 420 in FIG. 4C, rather than sensor 406 depower its sensing during its sleep period, it could also take one or more sensor readings during this period. After doing so, sensor 406 could exits its sensing mode, to depower its sensor between measurements. In one embodiment, service 402 may include an instruction in its TWT scheduling packets to sensor 406 indicating when sensor 406 should take measurements or the number of measurements that it should take before its next reporting period. The decision to take multiple readings before a sensor's reporting time may be based on the resource availability at the sensor (e.g., battery, memory, etc.) or triggered by some other factors. Note that these additional sensor readings may not have as accurate time stamps due to the lack of a TWT synchronization. In addition, OFDMA could be used to further allocate different radio resources to different IoT sensors based on how many additional sensing tasks they have performed.

Figure 5:
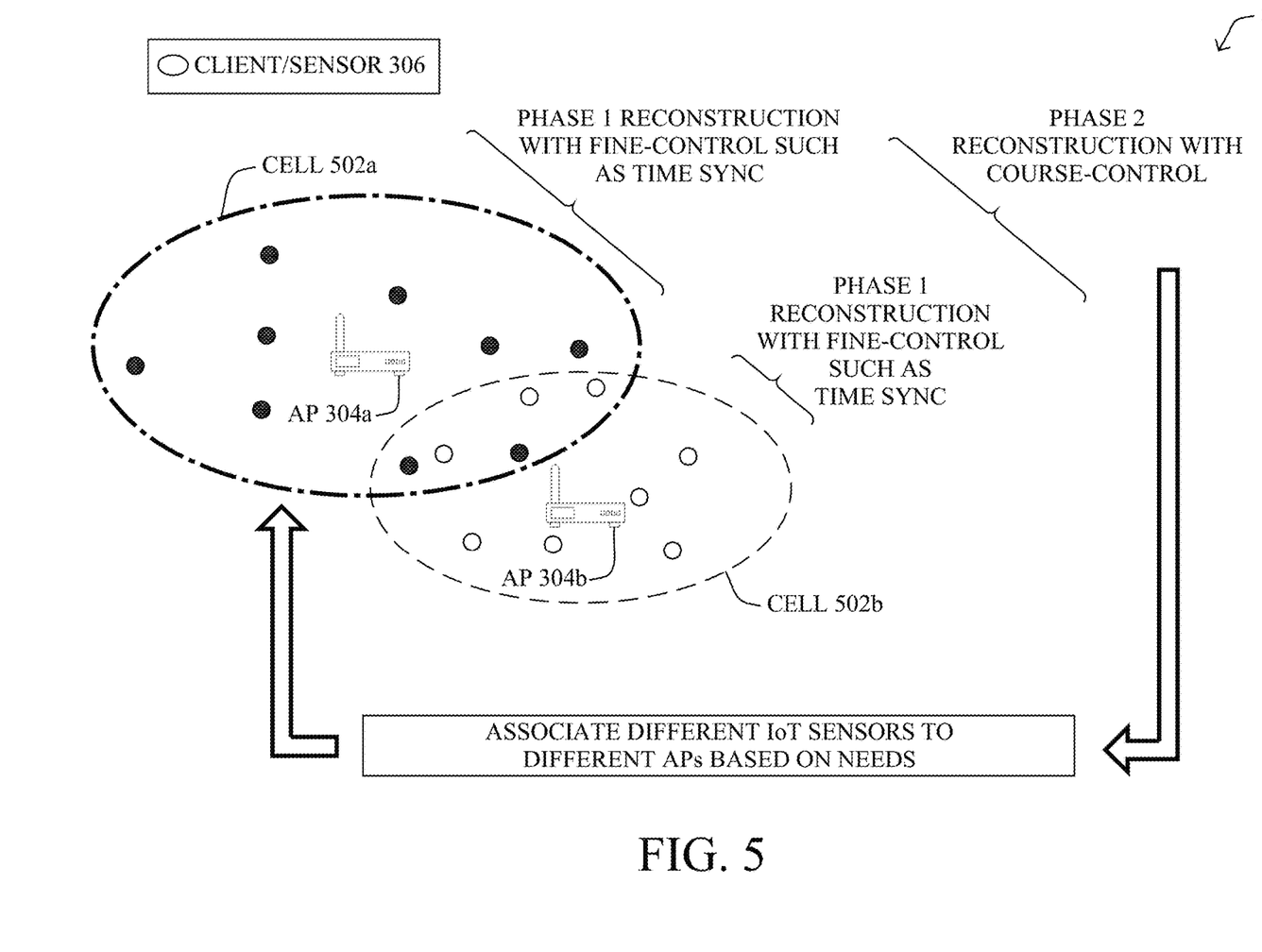
FIG. 5 illustrates an example of inter-cell coordination of sensor reporting.

FIG. 5 illustrates an example 500 of inter-cell coordination of sensor reporting, according to various embodiments. As shown, assume that there are two APs: AP 304*a* and AP 304*b*, each of which has a number of clients/sensors 306 within their cells 502*a*, 502*b*, respectively. Because neither AP 304 can cover the entire area, some of sensors 306 may be associated with AP 304*a*, while others may be associated with AP 304*b*. However, each AP 304 may have its own detailed TWT schedule/information and different APs may not share such low-level MAC-layer information. Accordingly, the techniques herein also introduce a course-level, inter-cell coordination compared to the fine-control, intra-cell coordination described previously.

One key observation is that the supervisory service for the wireless network usually has information regarding all of the sensors 306 inside an area. The service can use this information to assign different sensors to different APs. This allocation can be based on the types of sensors, their tasks, and/or their physical locations. In another embodiment, the service can also base the AP assignments on the qualities of the compressive sensing re-construction that it performs. Indeed, fine-control, intra-cell coordination can lead to better reconstruction compared to the course-control, inter-cell coordination. Moreover, compared to the intra-cell coordination, inter-cell coordination usually changes at a lower frequency (e.g., a different sensor allocation may be used during the day than at night). Different cell sizes and frequency bands can also be used for different groups of sensors 306, to enable flexible grouping, while reduce interference.

In a further embodiment, APs 304*a*-304*b* may exchange lists of their sensors and/or TWT schedules using off-channel transmissions. For example, APs 304*a*-304*b* may use the Neighbor Discovery Protocol (NDP) from Cisco Systems, Inc., or a similar protocol, to exchange information regarding clients/sensors 306. This enables each AP 304 to have a larger scope of view and change sensor assignments, if needed. For example, assume that AP 304*a* wants to increase the size of its cell 502*a*, to include more sensors 306, to achieve better re-construction quality over a larger area. Or, perhaps AP 304*a* wants to reduce its cell size, but increase the sensing frequency to track a fast-varying sensing target.

As shown, the supervisory service may also employ different phases/levels of coordination, for purposes of generating and implementing its compressive sensing schedules. In Phase 1, the service may perform re-construction using the sensor readings from each of cells 502*a*-502*b*, individually. Since this is performed locally within the cell, the readings will be more accurately synchronized in time. In addition, the compressive sensing schedule for Phase1 can also be updated at a higher frequency. In Phase2, the service may then perform re-construction using sensor readings for multiple cells 502, which has less accurate time synchronization. The results of this re-construction is also based on the results of the re-construction from Phase1 and its schedule may be updated less frequently than the cell-level scheduling.

Figure 6:
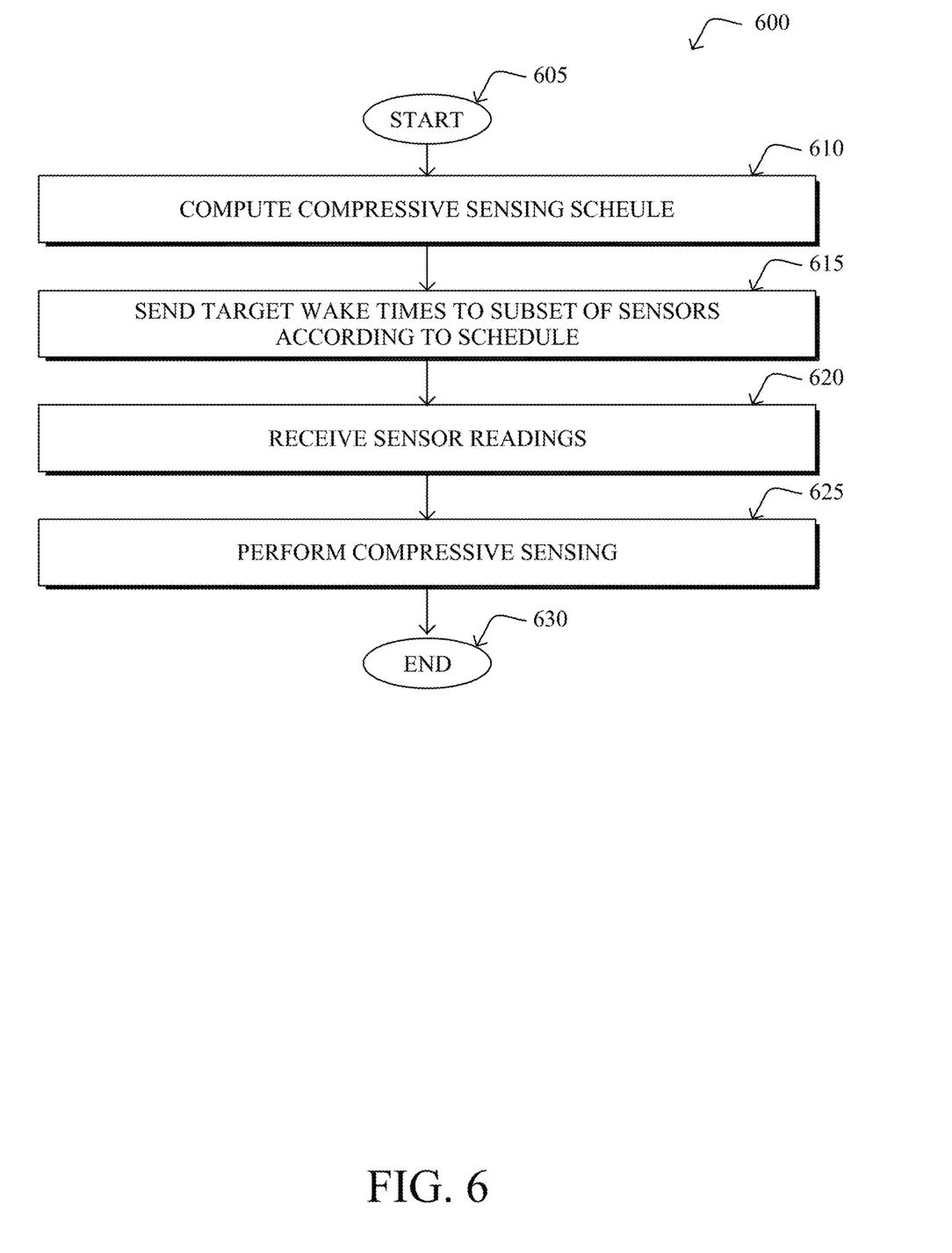
FIG. 6 illustrates an example simplified procedure for performing compressive sensing using TWTs.

FIG. 6 illustrates an example simplified procedure 600 for performing compressive sensing using TWTs, in accordance with one or more embodiments described herein. For example, a non-generic, specifically configured device (e.g., device 200) may perform procedure 600 by executing stored instructions (e.g., process 248), to provide a supervisory service in a wireless network. Indeed, the device may be a WLC, analytics service, or even the AP itself, in various implementations. The procedure 600 may start at step 605, and continues to step 610, where, as described in greater detail above, the service may compute a compressive sensing schedule for a plurality of sensors in the wireless network. As would be appreciated, the schedule itself may be based on the types of readings that the sensors take, their physical locations, the type of underlying system, and the like. For example, it may be possible to re-construct the temperature profile of a building using temperature readings from only a subset of the temperature sensors deployed throughout the building.

At step 615, as detailed above, the service may send TWT messages to a subset of the plurality of sensors, according to the computed compressive sensing schedule. In other words, the service may determine that readings from some of the sensors are not required and, in turn, use TWT signaling to notify the chosen sensors in the subset as to when they should wake and report their sensor readings. As would be appreciated, these sensors may enter into their sleep modes until their scheduled wake times, such as by depowering their radios. In further embodiments, the TWT message sent to at least one of the sensors may indicate that the sensor should take and report multiple readings, prior to its scheduled wake time.

At step 620, the service may receive, in response to the TWT messages, sensor readings from the subset of the plurality of sensors, as described in greater detail above. In other words, once a sensor has reached its scheduled wake time, it may take a sensor reading and report the reading back to the service for further analysis.

At step 625, as detailed above, the service may perform compressive sensing on the received sensor readings. For example, the service may attempt to re-construct/infer a sensor reading of one of the sensors outside of the subset (e.g., inferring a room's temperature based on readings from around the room, etc.). In further embodiments, the service may perform the compressive sensing in different phases, such as performing compressive sensing reconstruction on the received sensor readings on a per-access point basis and using those per-access point reconstructions to perform a second phase of reconstruction on an inter-AP basis. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for the implementation of compressive sensing in an IoT sensor network using TWT signaling. In some aspects, the techniques herein help to reduce the power consumption by the sensors, as they are not required to be powered at all times. Further, as TWT signaling is used instead of deploying the sensing schedule to the sensors, the schedule can be changed on the fly without any additional overhead to the sensors.

While there have been shown and described illustrative embodiments that provide for performing compressive sensing in a wireless network, it is to be understood that various other adaptations and modifications may be made within the spirit and scope of the embodiments herein. For example, while certain protocols are shown, such as 802.11, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   computing, by a supervisory device for a wireless network, a compressive sensing schedule for a plurality of sensors in the wireless network;
   sending, by the supervisory device, target wake time (TWT) messages to a subset of the plurality of sensors according to the computed compressive sensing schedule;
   receiving, at the supervisory device and in response to the TWT messages, sensor readings from the subset of the plurality of sensors; and
   performing, by the supervisory device, compressive sensing by using the sensor readings received from the subset of the plurality of sensors to reconstruct one or more sensor readings of one or more sensors outside of the subset of the plurality of sensors.

2. The method as in claim 1, wherein a sensor in the subset depowers its radio until a wake time indicated by the TWT message sent to that sensor.

3. The method as in claim 1, wherein the TWT messages indicate when the sensors in the subset are to take the sensor readings.

4. The method as in claim 3, wherein one of the TWT messages indicates that a particular sensor in the subset should take multiple sensor readings during a sleep period indicated by the TWT message.

5. The method as in claim 1, further comprising:
   associating the plurality of sensors with two or more different access points in the wireless network according to the compressive sensing schedule.

6. The method as in claim 5, wherein performing compressive sensing on the received sensor readings comprises:
   performing compressive sensing reconstruction on the received sensor readings on a per-access point basis; and
   performing compressive sensing reconstruction on the per-access point reconstructions.

7. The method as in claim 5, wherein the access points exchange information regarding the sensors using off-channel transmissions.

8. An apparatus, comprising:
   one or more network interfaces to communicate with a wireless network;
   a processor coupled to the network interfaces and adapted to execute one or more processes; and
   a memory configured to store a process executable by the processor, the process when executed configured to:
   compute a compressive sensing schedule for a plurality of sensors in the wireless network;
   send target wake time (TWT) messages to a subset of the plurality of sensors according to the computed compressive sensing schedule;
   receive, in response to the TWT messages, sensor readings from the subset of the plurality of sensors; and
   perform compressive sensing by using the sensor readings received from the subset of the plurality of sensors to reconstruct one or more sensor readings of one or more sensors outside of the subset of the plurality of sensors.

9. The apparatus as in claim 8, wherein a sensor in the subset depowers its radio until a wake time indicated by the TWT message sent to that sensor.

10. The apparatus as in claim 8, wherein the TWT messages indicate when the sensors in the subset are to take the sensor readings.

11. The apparatus as in claim 10, wherein one of the TWT messages indicates that a particular sensor in the subset should take multiple sensor readings during a sleep period indicated by the TWT message.

12. The apparatus as in claim 8, wherein the process when executed is further configured to:
   associate the plurality of sensors with two or more different access points in the wireless network according to the compressive sensing schedule.

13. The apparatus as in claim 12, wherein the apparatus performs compressive sensing on the received sensor readings comprises:
   performing compressive sensing reconstruction on the received sensor readings on a per-access point basis; and
   performing compressive sensing reconstruction on the per-access point reconstructions.

14. The apparatus as in claim 12, wherein the access points exchange information regarding the sensors using off-channel transmissions.

15. A tangible, non-transitory, computer-readable medium storing program instructions that cause a supervisory service for a wireless network to execute a process comprising:
   computing, by the supervisory device, a compressive sensing schedule for a plurality of sensors in the wireless network;
   sending, by the supervisory device, target wake time (TWT) messages to a subset of the plurality of sensors according to the computed compressive sensing schedule;
   receiving, at the supervisory device and in response to the TWT messages, sensor readings from the subset of the plurality of sensors; and
   performing, by the supervisory device, compressive sensing by using the sensor readings received from the subset of the plurality of sensors to reconstruct one or more sensor readings of one or more sensors outside of the subset of the plurality of sensors.

16. The computer-readable medium as in claim 15, wherein a sensor in the subset depowers its radio until a wake time indicated by the TWT message sent to that sensor.

17. The computer-readable medium as in claim 15, wherein the process further comprises:
  associating the plurality of sensors with two or more different access points in the wireless network according to the compressive sensing schedule.

18. The computer-readable medium as in claim 17, wherein performing compressive sensing on the received sensor readings comprises:
  performing compressive sensing reconstruction on the received sensor readings on a per-access point basis; and
  performing compressive sensing reconstruction on the per-access point reconstructions.

\* \* \* \* \*